United States Patent
Ni et al.

(10) Patent No.: US 9,304,222 B2
(45) Date of Patent: Apr. 5, 2016

(54) CATENARY SOURCE STEERING GEAR AND METHOD

(71) Applicant: CGGVERITAS SERVICES SA, Massy (FR)

(72) Inventors: Yuan Ni, Antony (FR); Behzad Vahida, Saint Michel sur Orge (FR)

(73) Assignee: CGGVERITAS SERVICES SA, Massy (FR)

( * ) Notice: Subject to any disclaimer, the term of this patent is extended or adjusted under 35 U.S.C. 154(b) by 382 days.

(21) Appl. No.: 13/764,918

(22) Filed: Feb. 12, 2013

(65) Prior Publication Data

US 2013/0208564 A1    Aug. 15, 2013

(30) Foreign Application Priority Data

Feb. 15, 2012  (FR) ...................... 12 51391

(51) Int. Cl.
*G01V 1/38*  (2006.01)

(52) U.S. Cl.
CPC ............ *G01V 1/3826* (2013.01); *G01V 1/3808* (2013.01)

(58) Field of Classification Search
CPC ........................... G01V 1/3826; G01V 1/3808
USPC .......................................................... 367/16
See application file for complete search history.

(56) References Cited

U.S. PATENT DOCUMENTS

| | | | | |
|---|---|---|---|---|
| 4,525,813 A | * | 6/1985 | Burrage | 367/20 |
| 4,780,856 A | * | 10/1988 | Becquey | 367/23 |
| 5,199,253 A | * | 4/1993 | Berger | 57/236 |
| 7,359,282 B2 | * | 4/2008 | Tulett | 367/23 |
| 2007/0223306 A1 | | 9/2007 | Toennessen | |
| 2008/0054640 A1 | * | 3/2008 | Olson | 290/42 |
| 2008/0175097 A1 | * | 7/2008 | Storteig et al. | 367/16 |
| 2010/0002538 A1 | | 1/2010 | Frivik et al. | |
| 2010/0054896 A1 | * | 3/2010 | Lababidy et al. | 414/137.7 |
| 2010/0149911 A1 | | 6/2010 | Hopperstad et al. | |
| 2011/0199857 A1 | * | 8/2011 | Garden | 367/20 |

FOREIGN PATENT DOCUMENTS

WO    2010/076646 A1    7/2010

OTHER PUBLICATIONS

"Talk: Catenary," Wikipedia, 2012, downloaded May 24, 2015, 32 pp.; excerpt of Dec. 10, 2010 is of relevance, pp. 16-18.*
French Preliminary Search Report issued in related FR application No. 1251391 dated Oct. 15, 2012.
French Written Opinion issued in related FR application No. 1251391.

* cited by examiner

*Primary Examiner* — Daniel L Murphy
(74) *Attorney, Agent, or Firm* — Patent Portfolio Builders PLLC (57) ABSTRACT

A method and a catenary seismic source steering gear for towing seismic sources underwater. The catenary gear includes plural seismic sources configured to generate seismic waves underwater; a main rope configured to span between first and second vessels; and a connecting system configured to connect the plural seismic sources to the main rope. The main rope takes a substantially catenary shape when towed by the first and second vessels underwater.

20 Claims, 12 Drawing Sheets

CATENARY SOURCE STEERING GEAR AND METHOD

BACKGROUND

1. Technical Field

Embodiments of the subject matter disclosed herein generally relate to methods and systems and, more particularly, to mechanisms and techniques for towing seismic sources underwater.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which are especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon reservoirs.

Figure 1:
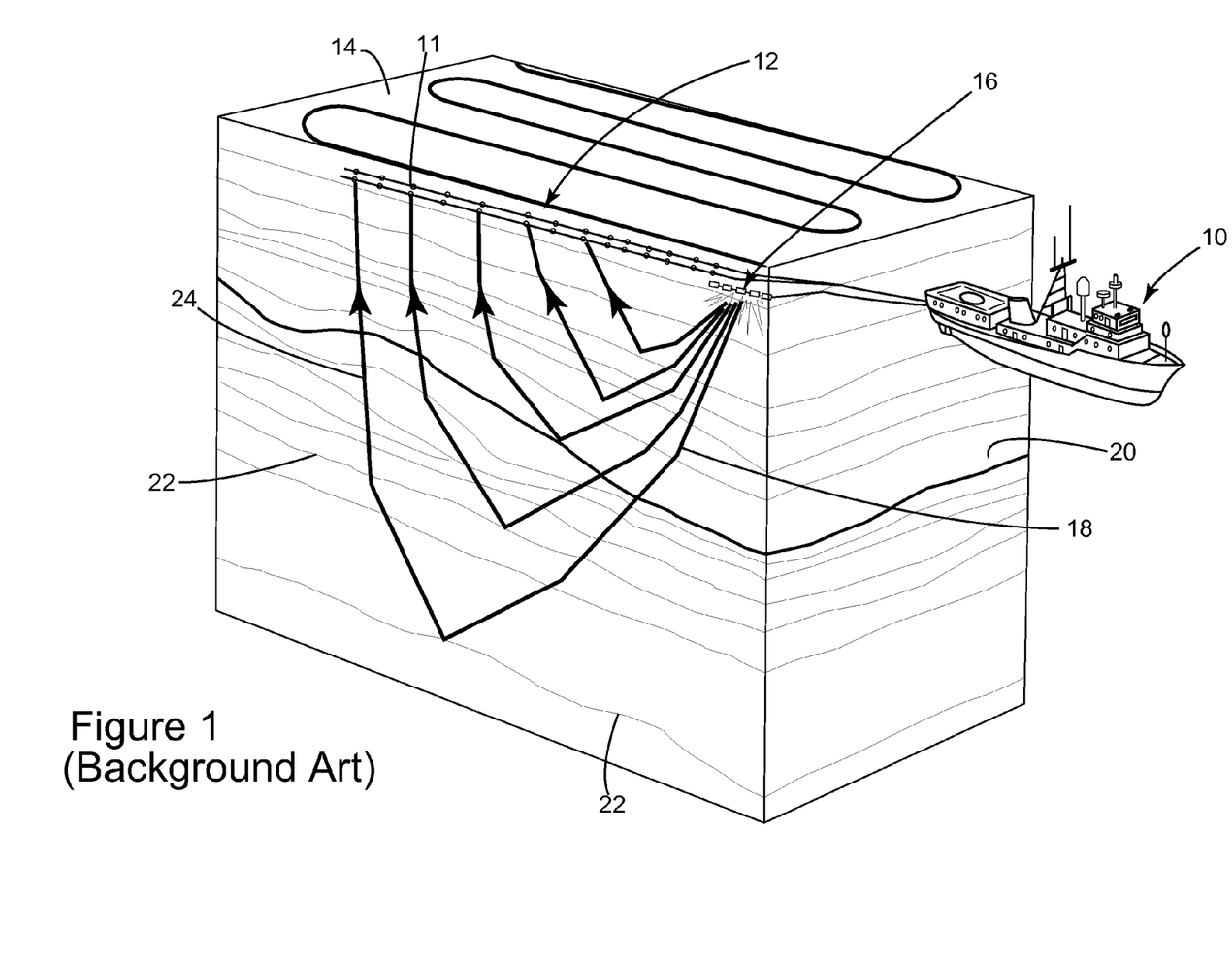
FIG. 1 is a schematic diagram of a conventional marine seismic acquisition configuration.

A traditional system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to a surface 14 of the ocean. The streamers may be disposed to have other than horizontal spatial arrangements. The vessel 10 also tows a seismic source array 16 that is configured to generate a seismic wave 18. The seismic wave 18 propagates downward toward the seafloor 20 and penetrates the seafloor until eventually a reflecting structure 22 (reflector) reflects the seismic wave. The reflected seismic wave 24 propagates upward until it is detected by the receiver 11 on the streamer 12. Based on the data collected by the receiver 11, an image of the subsurface is generated by further analyses of the collected data.

Figure 2:
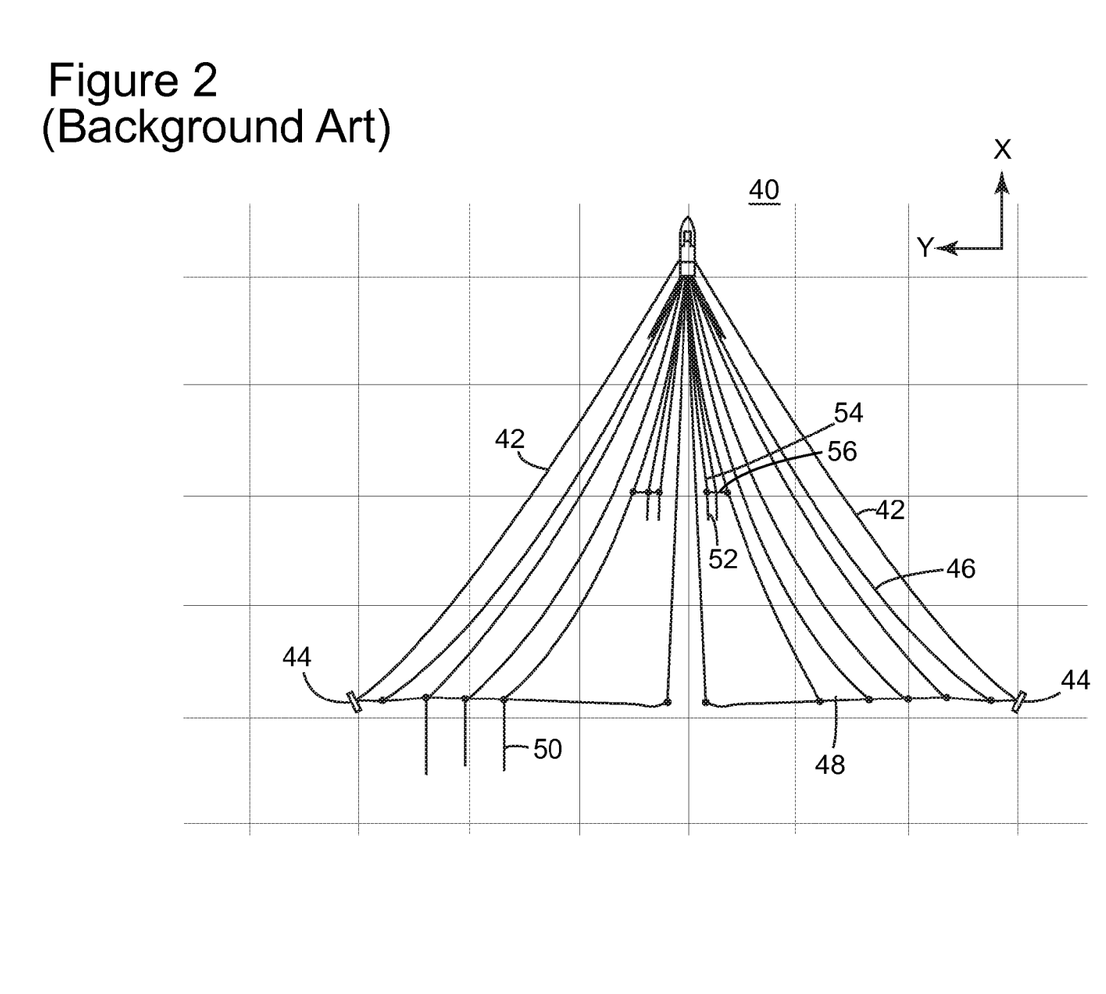
FIG. 2 is a schematic diagram of another conventional marine seismic acquisition configuration.

The seismic source array 16 may include plural individual source elements. The individual source elements may be grouped in sub-arrays, so that each source array may include one or more sub-arrays. The individual source elements may be distributed in various patterns, e.g., circular, linear, at various depths in the water. FIG. 2 shows a vessel 40 towing two cables 42 provided at respective ends with deflectors 44. Plural lead-in cables 46 are connected to streamers 50. The plural lead-in cables 46 also connect to the vessel 40. The streamers 50 are maintained at desired separations from each other by separation ropes 48. Plural individual source elements 52 are also connected to the vessel 40 through lead-in umbilical 54 and to the lead-in cables 46 through gun tag ropes 56. This configuration does not allow accurate control of the plural individual source elements and also involves a large number of cables for towing each source, which increases the existing drag.

A limitation of the existing structures is the high number of seismic sources and, implicitly, a high number of source vessels necessary for performing a wide-azimuth (WAZ) survey. WAZ seismic surveys provide better illumination than traditional marine surveys in complex geologic areas by essentially "shining the light" on the formations from many directions. The "light" comprises seismic signals over a wide range of azimuths, or angles of incidence, on the subsurface reflectors. WAZ surveys typically use multiple source and streamer vessels to obtain this advantage.

Thus, it is desirable to design a new towing system that uses fewer vessels for achieving the WAZ survey or uses the same number of vessels but increases the number of sources towed by the existing vessels.

Another limitation of the existing structures is today felt for arctic acquisitions. In this harsh environment, pieces of ice float at the surface of the water and are likely to interfere with the floats that maintain the sources at desired depths. Thus, there is a need to have a source system that does not have a float component to interact with the floating ice.

SUMMARY

According to an exemplary embodiment, there is a catenary source steering gear for towing seismic sources underwater. The catenary source steering gear includes plural seismic sources configured to generate seismic waves underwater; a main rope configured to span between first and second vessels; and a connecting system configured to connect the plural seismic sources to the main rope. The main rope takes a substantially catenary shape when towed by the first and second vessels underwater.

According to another exemplary embodiment, there is a seismic surveying system for towing seismic sources underwater. The system includes a streamer vessel; plural streamers attached to the streamer vessel and configured to be towed by the streamer vessel; and a catenary seismic source steering gear configured to be towed by first and second vessels. The catenary seismic source steering gear includes plural seismic sources configured to generate seismic waves underwater, a main rope configured to span between the first and second vessels, and a connecting system configured to connect the plural seismic sources to the main rope. The main rope takes a substantially catenary shape when towed by the first and second vessels underwater.

According to still another exemplary embodiment, there is a method for towing seismic sources underwater with a catenary seismic source steering gear. The method includes attaching plural seismic sources, configured to generate seismic waves underwater, to a connecting system; attaching the connecting system to a main rope; and towing the main rope between first and second vessels. The main rope takes a substantially catenary shape when towed by the first and second vessels underwater.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a catenary shaped source steering gear configured to couple to one or more seismic sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a catenary source steering gear for towing seismic sources underwater includes plural seismic sources configured to generate seismic waves underwater, a main rope configured to span between first and second vessels, and a connecting system configured to connect the plural seismic sources to the main rope. The main rope takes a substantially catenary shape when towed by the first and second vessels underwater.

Figure 3:
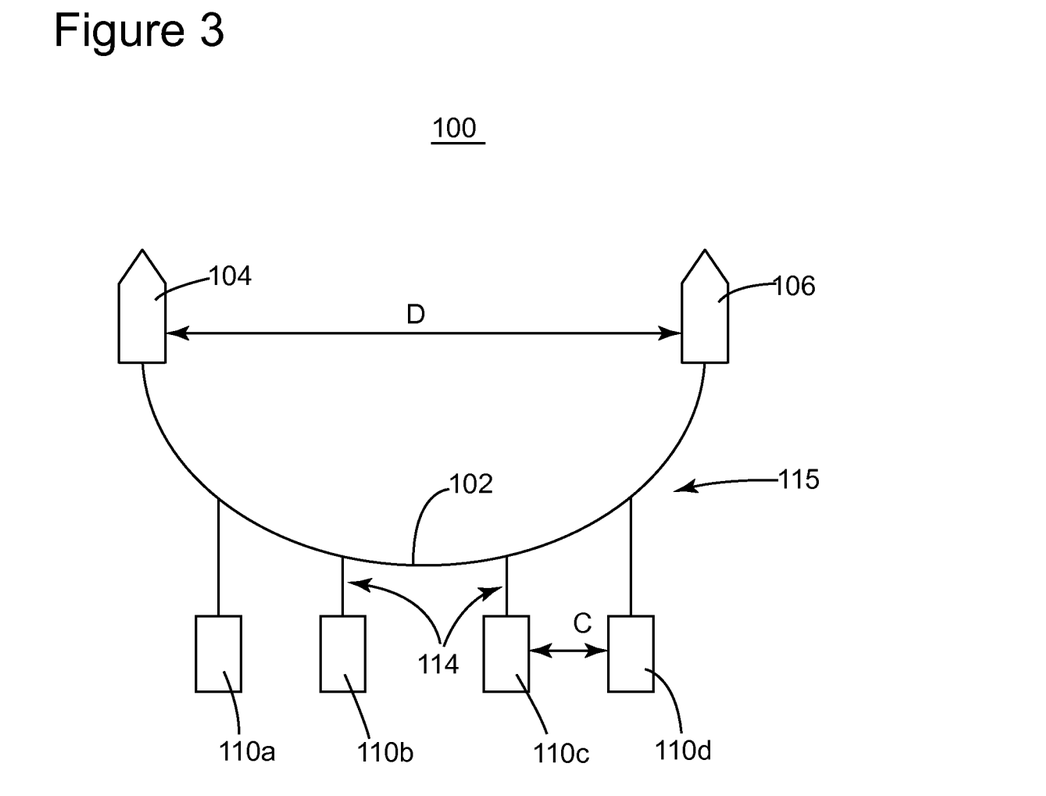
FIG. 3 is a schematic diagram of a catenary source steering gear according to an exemplary embodiment.

As illustrated in FIG. 3, a seismic surveying system 100 includes a main rope 102 configured to be attached between a first vessel 104 and a second vessel 106. When towed in water, the main rope 102 takes a catenary shape as shown in the figure. Plural seismic sources 110a-110d are connected to the main rope 102 through a connecting system 114. A distance between the vessels 104 and 106 is D and a distance between two adjacent seismic sources is C. The main rope 102 together with the seismic sources 110a-d and the connecting system 114 form a catenary source steering gear 115. In one application, the main rope does not include any other cable, e.g., functional cables. In other words, in this particular application, the main rope is not an umbilical. An umbilical is a cable that includes functional cables and tension cables. The functional cables provide various functions, e.g., electrical power, data transmission capabilities, compressed air, etc., while the tension cables are configured to undertake the mechanical stresses associated with the towing function.

The main rope 102 may be a synthetic rope. Of course, the main rope may also be made out of steel or other materials that have enough mechanical resistance to tow the seismic sources. The seismic sources 110a-d may include air-guns or vibratory sources. In one application, the seismic sources may include any known marine source. A vibratory source may be preferable because there is no need to have a compressor (a bulky piece of equipment) as for the air-guns, resulting in a reduced weight of the source or vessel. For electric vibratory sources, the electric generators may be placed on the towing vessels and the electric power may be supplied to the sources through appropriate cables.

Figure 4:
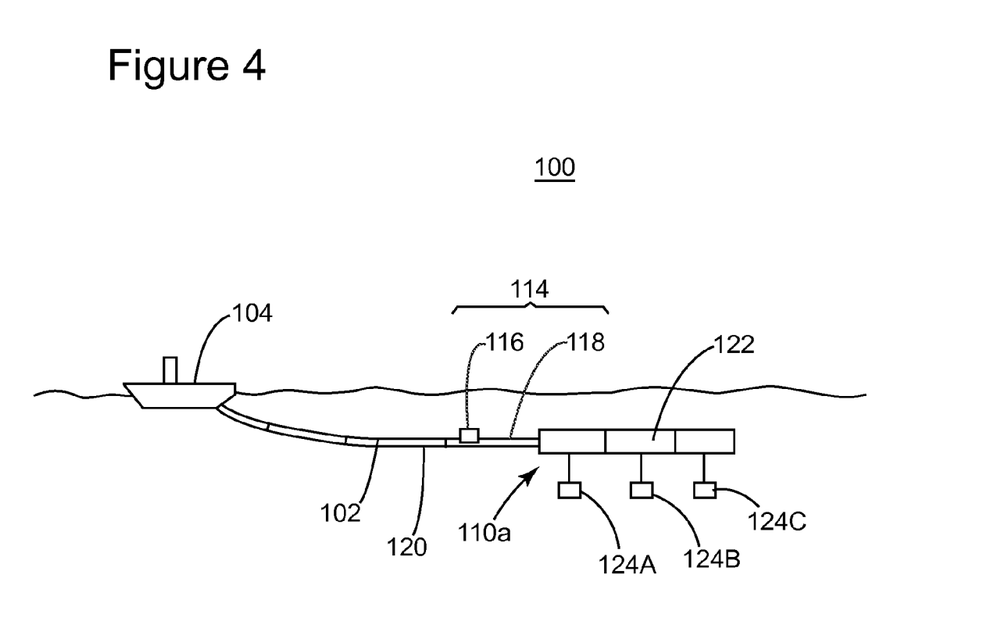
FIG. 4 is a side view of the catenary source steering gear according to an exemplary embodiment.

Depending on the type of source, functional cables may also be used. For example, FIG. 4 shows a side view of the system 100 in which the main rope 102 is attached to a connection device 116 from which a lead-in umbilical 118 is attached. The connection 116 and the lead-in umbilical 118 form the connecting system 114. A functional cable 120 is attached to the main rope 102 and connects the vessel 104 to, for example, the seismic source 110a. The functional cable may include an electric cable, e.g., for transmitting electrical power, a data cable, e.g., for transmitting signals between the vessel and the seismic source, a hose, e.g., for transmitting compressed air, etc. These cables may be independently attached to the main rope 102 or they may be manufactured together into an umbilical cable and then attached to the main rope. The lead-in umbilical 118 is connected with the other end to a corresponding seismic source 110a.

Figure 5A:
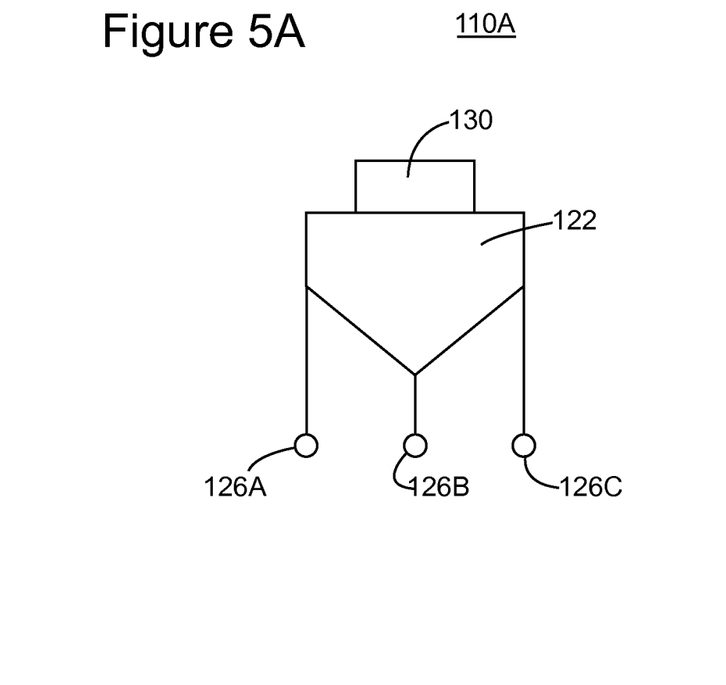
FIGS. 5A-B are schematic diagrams of a seismic source according to an exemplary embodiment.
Figure 5B:
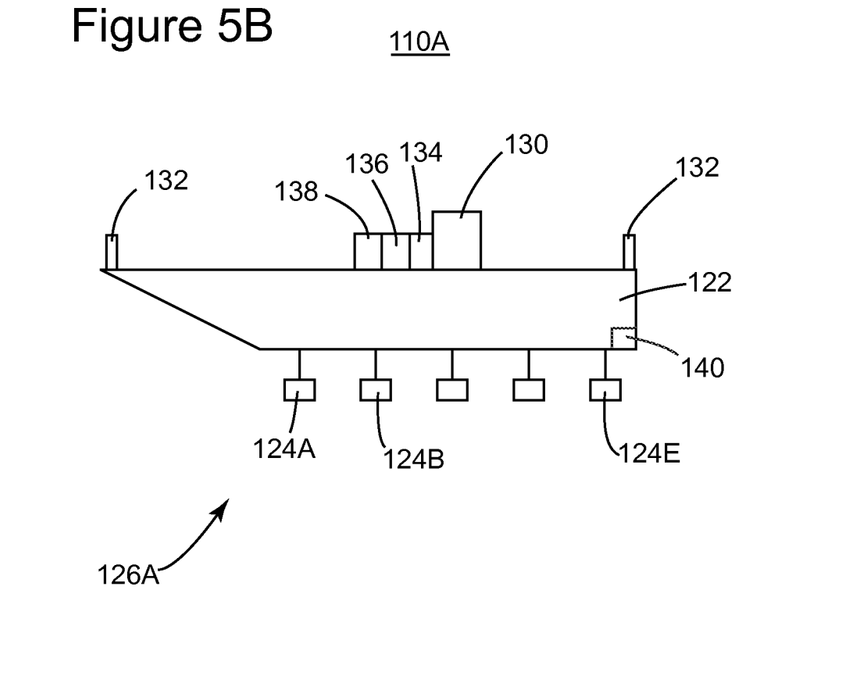

In one application, the seismic source 110a may include a float 122 from which plural individual seismic source elements 124A-C are attached, as shown in FIG. 4. The number of source elements is not intended to limit the exemplary embodiments. More specifically, the seismic source 110a is illustrated in FIG. 5A in cross-section. The seismic source 110a includes the float 122 and three sub-arrays 126A-C. Each sub-array includes one or more individual source elements 124A. For example, as shown in FIG. 5B, a single sub-array 126A includes plural individual source elements 124A-E.

The float 122 may be configured to float at the surface of the water or to float underwater, which is preferred for arctic exploration. The float 122 may be provided with a compressor 130 for providing compressed air to the individual source elements 124A-E. The compressor 130 may be electric or diesel or other known type. The electric compressor may be smaller than the diesel compressor if the power is generated on the towing vessel. In one application, the compressor is not distributed to the individual source elements but rather is provided on the vessel. However, if the compressor is too far from the sources for efficiently transmitting the compressed air, a floating platform may be towed by the vessel and the compressor may be provided on the floating platform. In this case, the floating platform is placed in the source spread and towed, for example, with the main tow rope. Then, one or more hoses that carry compressed air from the vessel or from the floating compressor holding the compressor to the seismic sources are provided. The float 122 may be provided with other equipment, for example, a global positioning system (GPS) 132, a battery 134, a central processing unit (CPU) 136, a memory 138, etc. The float may have its own propulsion device (e.g., propeller, thruster, etc.) 140 to provide additional propulsion at each sub-array. This configuration may be advantageous for large towing systems to reduce the propulsion burden on the vessels and also to adjust a relative cross-line position of the various sub-arrays.

Figure 6:
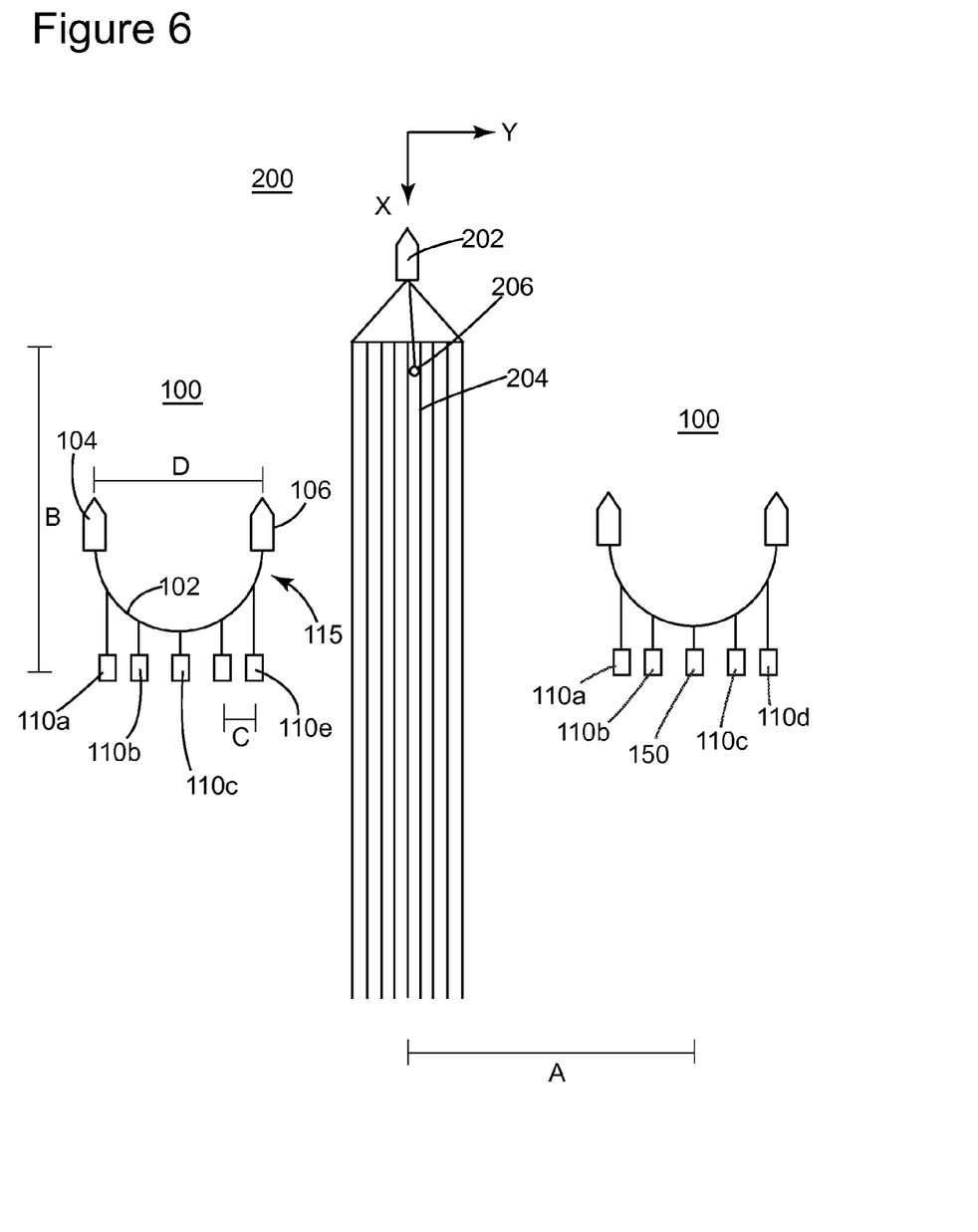
FIG. 6 is a schematic diagram of a seismic survey system that includes a catenary source steering gear according to an exemplary embodiment.

According to an exemplary embodiment illustrated in FIG. 6, a seismic survey system 200 may be designed to use, for example, two catenary source steering gear systems 100. The system 200 may include a streamer vessel 202 configured to tow plural streamers 204. Optionally, the vessel 202 may tow one or more seismic sources 206. A catenary source steering gear 115 may be provided at a distance A (cross-line distance) away from a middle point of the streamers 204 along the cross-line direction Y. A distance between adjacent seismic sources 110b and 110c is C and a distance between first and second vessels 104 and 106 is D. An inline off-set (along direction X) between a first end of the streamers 204 and the seismic sources 110 is B. Distances A to D may be adjusted depending on the goal of the seismic survey.

The seismic sources 110a-e and 206 may be distributed to have an in-line or a cross-line distribution. The in-line distribution is illustrated by the seismic source 206 in FIG. 6 and it is defined by the source or sources being towed by the vessel along an in-line direction X along with the streamers. The cross-line distribution is illustrated by the seismic sources 110a-e in FIG. 6 and it is defined by the sources being towed by a vessel other than the streamer vessel 202 and positioned in the cross-line direction Y to the streamers. The novel catenary source steering gear 115 may be used both in-line and cross-line. However, for achieving a good WAZ survey, the catenary source steering gear 115 is preferably used in a cross-line arrangement as illustrated in FIG. 6. One or more of the catenary source steering gears may be used. FIG. 6 also shows an optional floating platform 150 for holding the compressor discussed above.

Figure 7:
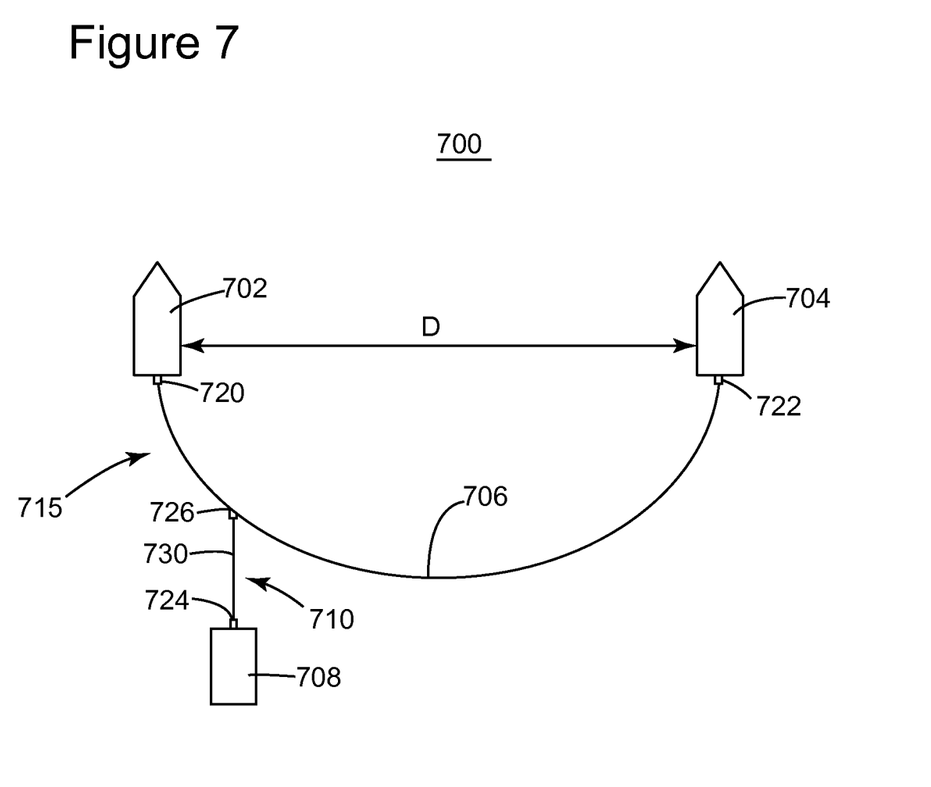
FIG. 7 is a schematic diagram of another catenary source steering gear according to an exemplary embodiment.

In another exemplary embodiment illustrated in FIG. 7, a system 700 includes first and second vessels 702 and 704 and a catenary source steering gear 715. It is noted that the novel catenary source steering gears discussed in this document are not limited to two vessels. Such catenary gears may have one or more than two vessels. The catenary source steering gear 715 may include a main rope 706, seismic sources 708 and a connecting system 710. The main rope 706 may be connected to one or two actuator devices 720 and 722. For example, the actuator devices 720 and 722 may be winches. The actuator devices may be provided on the vessels and used to adjust the length of the main rope 706. Although FIG. 7 shows the actuator devices being attached to a back of the towing vessels, it is noted that the actuator devices and/or the main rope 706 may be attached to sides of the towing vessels.

In another exemplary embodiment, further actuator devices 724 and 726 may be provided, between the main rope 706 and the seismic source 708, to adjust the position of the seismic source 708. For example, the actuator device may be provided on the seismic source 708. Alternatively, the actuator device 726 may be attached to the main rope 706. The actuator devices 724 and 726 may be used together or not in a catenary source steering gear. An umbilical or cable or rope 730 may connect the seismic source 708 to the main rope 706.

Figure 8:
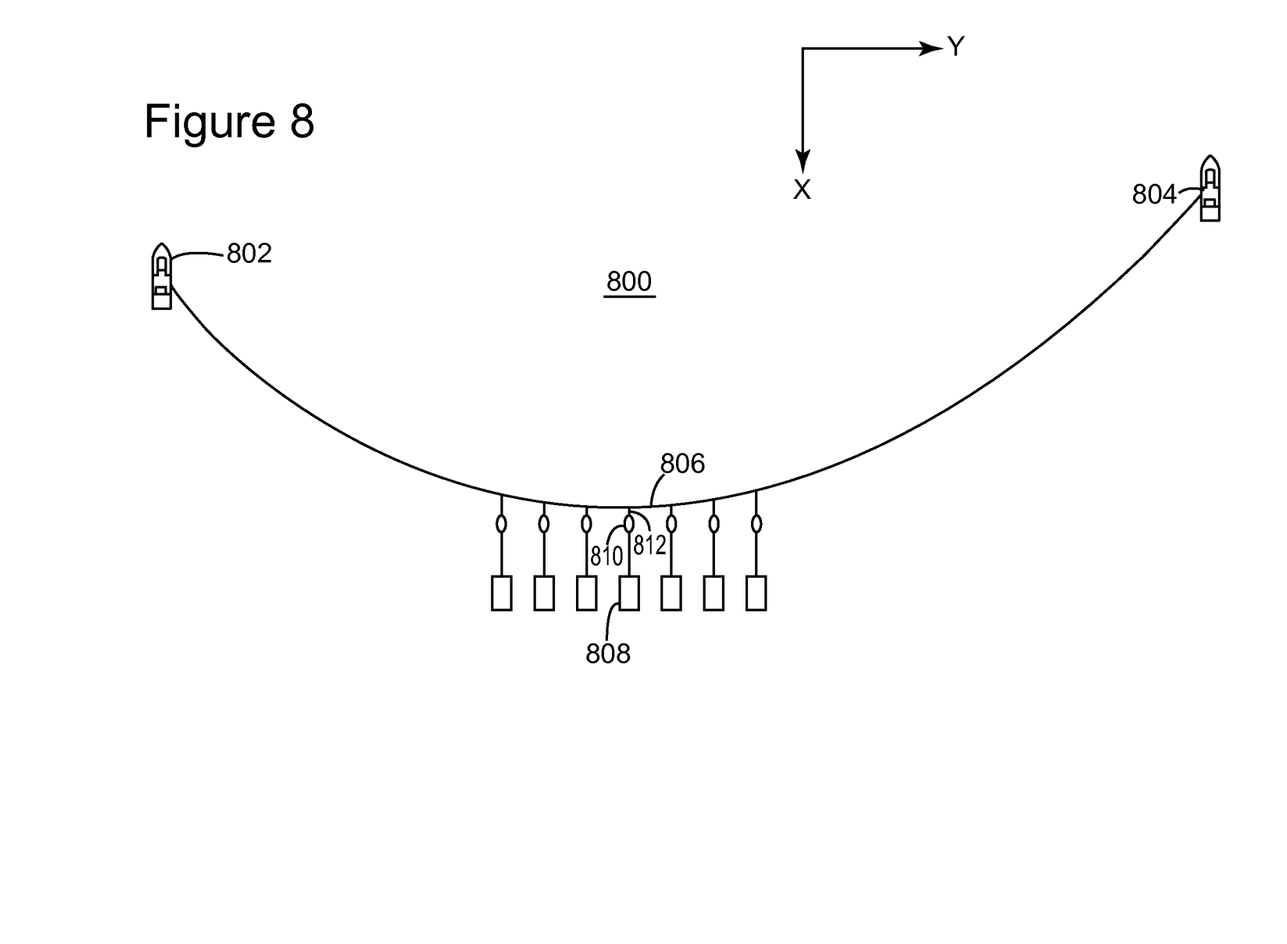
FIG. 8 is a schematic diagram of still another catenary source steering gear according to an exemplary embodiment.

Exemplary embodiments for connecting the seismic source 708 to the main rope 706 are now discussed. These embodiments also address the situation of controlling a position of the seismic source 708. In an exemplary embodiment illustrated in FIG. 8, a system 800 includes first and second vessels 802 and 804 towing a main rope 806. Seismic sources 808 may be attached through a control mechanism 810 to a lead-in cable 812. The control mechanism 810 may be a mechanism 810 disclosed in FIG. 9, a bird or other known mechanism.

Figure 9:
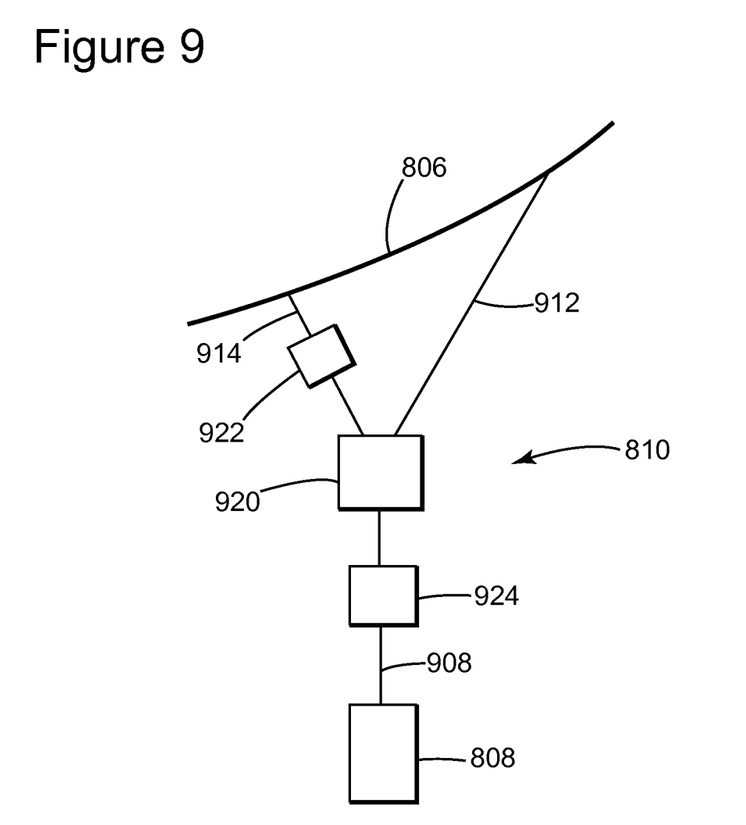
FIG. 9 is a schematic diagram of a control device for controlling a position of a catenary source steering gear according to an exemplary embodiment.

According to an exemplary embodiment illustrated in FIG. 9, the control mechanism 810 has a body 920 to which a first actuating device (e.g., winch) 922 and a second actuating device (e.g., winch) 924 may be attached. The first actuating device 922 is connected between the body 920 and a first link 914, while the second actuating device 924 is connected between the body 920 and a second link 908. A cable 912 connects the body 920 to the main rope 806. The second link may be connected to the seismic source 808 (see FIG. 8) and the first link 914 may be connected to the main rope 806 (see FIG. 8).

Both actuating devices may be activated from the vessels, either to retract or release the corresponding cables and/or ropes. By activating the second actuating device 924, the length of the second link 908 is modified, so that the seismic source 808 is moved closer or farther along direction X from vessel 802. By activating the first actuating device 922, the length of the first link 914 is modified, so that the seismic source 808 is moved laterally (left or right) along direction Y relative to vessel 802. When the first actuating device 922 is activated, the seismic source 808 also may move along the X axis. Thus, control of the seismic source 808 is achieved along both the X and Y directions. It is noted that in FIG. 8 the vessels 802 and 804 advance along axis X. It is also noted that the control mechanism 810 may also be used for other of the exemplary embodiments discussed herein.

The actuating devices 922 and 924 do not have to be provided at the control mechanism 810. For example, the first actuating device 922 may be provided between the main rope 806 and the first link 914. In another embodiment, only one actuating device is provided, either the first one or the second one. Other arrangements may be employed (e.g., placing the second actuating device 924 on cable 912) as will be recognized by those skilled in the art as long as control of the seismic source 808 is achieved.

Figure 10:
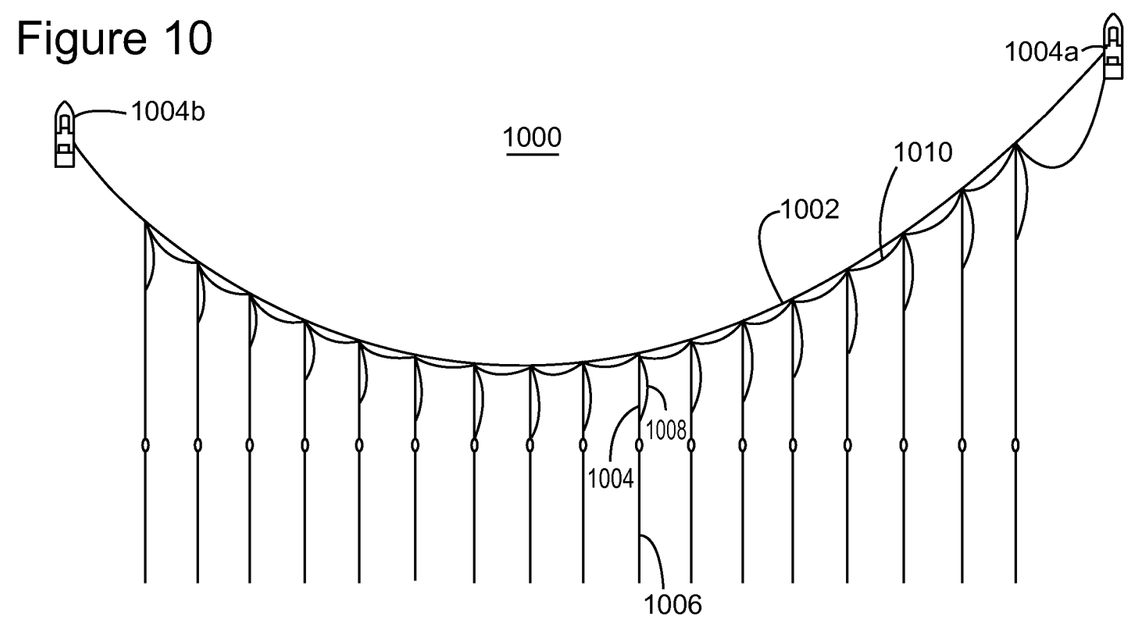
FIG. 10 is a schematic diagram of a catenary source steering gear according to another exemplary embodiment.

In terms of the arrangement of the ropes and cables, FIG. 10 illustrates an exemplary embodiment in which a seismic survey system 1000 has the main rope 1002 connected to two vessels 1004a and 1004b. This arrangement is also applicable to more than two vessels or for a vessel and one or more deflectors. The main rope 1002 may be a synthetic rope configured to be strong (e.g., Dyneema fibers, see www-.dyneema.com). A link 1005 is connected to the seismic source 1006 and the main rope 1002 while data or power cables 1008 and 1010 are loosely connected to the link 1005 and the main rope 1002 so that little mechanical stress is applied to these cables. The cables 1008 and 1010 may include cables not only for transmitting data but also for transmitting power, compressed air, gas, etc.

Figure 11:
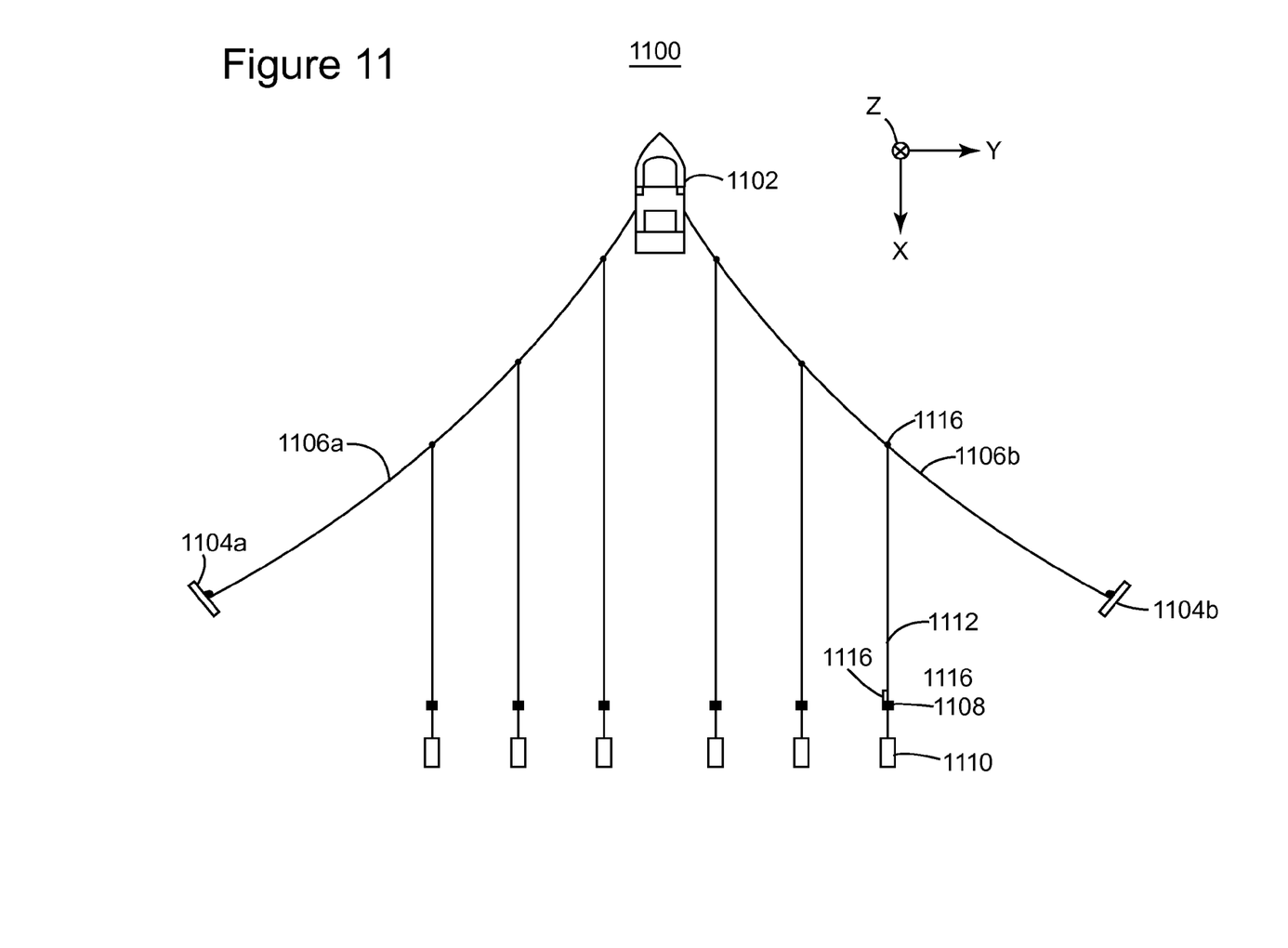
FIG. 11 is a schematic diagram of a catenary source steering gear having a single vessel according to an exemplary embodiment.

According to another exemplary embodiment, the catenary source steering gears of the previous embodiments may also be implemented using a single vessel and one or more deflectors. FIG. 11 illustrates such a system 1100 which has a single vessel 1102 that tows two deflectors 1104a and b. The two deflectors are attached to the single vessel through two main ropes 1106a and b. A bird 1108 may be used to steer a seismic source 1110.

A bird is a device deployed underwater that is capable of changing its position based on instructions received from the vessel (e.g., the master vessel) or based on instructions stored at a local control device of the bird (e.g., the bird may have sensors that determine its actual position and a control mechanism adjusts the position of the bird to achieve a desired position). The bird may have wings that are actuated by an appropriate motor for adjusting its position (see U.S. Pat. No. 7,267,070 assigned to the assignee of this application, the entire content of which is incorporated herein by reference).

The bird 1108 may be connected to the main rope 1106b via a link 1112. An actuator device 1116 (e.g., a winch) may be provided between the rope 1106b and the link 1112 so that the position of the seismic source 1110 along axis X may be controlled. The bird may be provided at other locations as illustrated in FIG. 11. The bird 1108 is configured to move laterally (along axis Y) or up and down (along axis Z) as necessary.

One advantage of one or more of the exemplary embodiments discussed above is that a cross-line distance between the seismic sources and the streamers may be adjusted as desired, and a number of the seismic sources towed besides the streamers may be increased relative to the conventional configurations with a reduced cost because fewer vessels are necessary. Further, the density of the illumination may be increased by using plural seismic sources.

For example, using blended acquisition, i.e., multiple seismic sources being actuated at the same time, suppose that n seismic sources are provided on a single catenary source steering gear. Then, with almost twice the price of a single source boat (because the catenary source steering gear uses two boats to tow the seismic sources), the novel embodiment achieves the effect of n source boats, where n can vary from 4 up to a large number.

Thus, for a WAZ survey, fewer vessels are necessary. Further, the steerability of the sources is improved because they are relatively close to the vessels. Further, it is possible to directly control the position of the two vessels, the length of the main rope and the relative position of the main rope, which also improves the steerability of the seismic sources. Additionally, winches can be added to adjust the length of the rope segments defining the distance between the source sub-arrays or between the source arrays (which are the grouping of several source sub-arrays acting as a single source array). This change of the Y distance can be used for configuration change of the source arrays or for changing the distance between the source arrays themselves.

Figure 12:
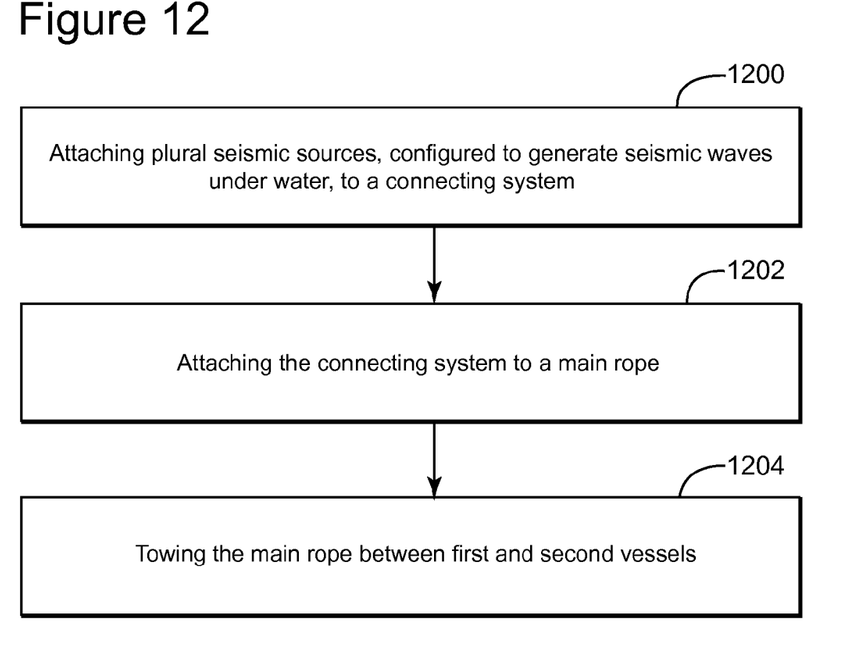
FIG. 12 is a flowchart illustrating a method for towing seismic sources with a catenary source steering gear according to an exemplary embodiment.

According to an exemplary embodiment illustrated in FIG. 12, there is a method for towing seismic sources underwater with a catenary seismic source steering gear. The method includes a step 1200 of attaching plural seismic sources, configured to generate seismic waves underwater, to a connecting system; a step 1202 of attaching the connecting system to a main rope; and a step 1204 of towing the main rope between first and second vessels. The main rope takes a substantially catenary shape when towed by the first and second vessels underwater.

The disclosed exemplary embodiments provide a system and a method for towing seismic sources underwater. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A catenary source steering gear for towing seismic sources underwater, the catenary source steering gear comprising:
   plural seismic sources configured to generate seismic waves underwater;
   a main rope configured to span between first and second vessels; and
   a connecting system configured to connect the plural seismic sources to the main rope,
   wherein the main rope takes a substantially catenary shape when towed by the first and second vessels underwater.

2. The catenary gear of claim 1, wherein the main rope is made of a synthetic material.

3. The catenary gear of claim 1, wherein a seismic source of the plural seismic sources includes an air-gun.

4. The catenary gear of claim 1, wherein the seismic source of the plural seismic sources includes a vibratory source.

5. The catenary gear of claim 1, wherein the connecting system comprises:
   a connection device configured to be attached to the main rope; and
   a lead-in umbilical connected between the connection device and a seismic source.

6. The catenary gear of claim 1, wherein a seismic source of the plural seismic sources comprises:
   a float connected to the connecting system; and
   plural individual seismic source elements connected to the float, wherein each individual seismic source element is configured to generate a corresponding sound wave.

7. The catenary gear of claim 6, wherein the float is configured to accommodate a compressor, a global positioning system, a battery, a central processing unit, and a storage device.

8. The catenary gear of claim 1, further comprising:
   an actuating device connected to the main rope and configured to adjust a length of the main rope.

9. The catenary gear of claim 1, further comprising:
   an actuating device connected between the main rope and a seismic source of the plural seismic sources to adjust a position of the seismic source.

10. The catenary gear of claim 1, wherein the connecting system further comprises:
    a control device configured to adjust a position of a corresponding seismic source along an inline direction and a cross-line direction.

11. The catenary gear of claim 10, wherein the control device comprises a bird.

12. The catenary gear of claim 10, wherein a body of the control device is attached with two cables to the main rope.

13. The catenary gear of claim 1, further comprising:
    functional cables connecting the first or second vessel to the plural seismic sources.

14. A seismic surveying system for towing seismic sources underwater, the system comprising:
    a streamer vessel;
    plural streamers attached to the streamer vessel and configured to be towed by the streamer vessel; and
    a catenary seismic source steering gear configured to be towed by first and second vessels,
    wherein the catenary seismic source steering gear includes,
    plural seismic sources configured to generate seismic waves underwater,
    a main rope configured to span between the first and second vessels, and a connecting system configured to connect the plural seismic sources to the main rope, wherein the main rope takes a substantially catenary shape when towed by the first and second vessels underwater.

15. The system of claim 14, wherein the main rope is made of a synthetic material.

16. The system of claim 14, wherein the connecting system comprises:
    a connection device configured to be attached to the main rope; and
    a lead-in umbilical connected between the connection device and a seismic source of the plural seismic sources.

17. The system of claim 14, wherein a seismic source of the plural seismic sources comprises:
    a float connected to the connecting system; and
    plural individual seismic source elements connected to the float, wherein each individual seismic source element is configured to generate a corresponding sound wave.

18. The system of claim 17, wherein the float is configured to accommodate a compressor, a global positioning system, a battery, a central processing unit, and a memory.

19. The system of claim 18, further comprising:
    an actuating device connected to the main rope and configured to adjust a length of the main rope.

20. A method for towing seismic sources underwater with a catenary seismic source steering gear, the method comprising:
    attaching plural seismic sources, configured to generate seismic waves underwater, to a connecting system;
    attaching the connecting system to a main rope; and
    towing the main rope between first and second vessels,
    wherein the main rope takes a substantially catenary shape when towed by the first and second vessels underwater.

* * * * *